United States Patent
Giovannini et al.

(10) Patent No.: US 10,404,324 B1
(45) Date of Patent: Sep. 3, 2019

(54) TRANSFORMABLE NEAR FIELD COMMUNICATION TAG

(71) Applicant: GCL INTERNATIONAL SARL, Foetz (LU)

(72) Inventors: Marco Giovannini, Luxembourg (LU); Piero Cavigliasso, Kockelscheuer (LU); Luca Viale, Alessandria (IT)

(73) Assignee: GCL INTERNATIONAL SARL, Foetz (LU)

( * ) Notice: Subject to any disclaimer, the term of this patent is extended or adjusted under 35 U.S.C. 154(b) by 0 days.

(21) Appl. No.: 16/146,861

(22) Filed: Sep. 28, 2018

(51) Int. Cl.
*H04B 5/00* (2006.01)
*H04W 4/12* (2009.01)
*H04W 4/80* (2018.01)

(52) U.S. Cl.
CPC ......... *H04B 5/0031* (2013.01); *H04B 5/0056* (2013.01); *H04W 4/12* (2013.01); *H04W 4/80* (2018.02)

(58) Field of Classification Search
CPC ..... H04B 5/0031; H04B 5/0056; H04W 4/12; H04W 4/80
USPC ........................................................ 455/41.1
See application file for complete search history.

(56) References Cited

U.S. PATENT DOCUMENTS

2015/0032569 A1*  1/2015  Stromberg ......... G06K 7/10009
                                                      705/26.35
2015/0087427 A1*  3/2015  Wane ..................... A63F 13/213
                                                      463/43

FOREIGN PATENT DOCUMENTS

WO    WO-2016035012 A1 *  3/2016  ........... G06Q 30/018

* cited by examiner

*Primary Examiner* — Ayodeji O Ayotunde

(57) ABSTRACT

A system is disclosed comprising a near field communication tag that is transformable from a first state to a second state. The system also comprises a server program stored on a non-transitory storage medium that, when executed by a server apparatus, receives a first tag report from a user device in response to the tag being tapped while being in the first state, sends a first response to the user device or to another user device in response to the first tag report being received, receives a second tag report from the user device in response to the tag being tapped while being in the second state, and sends a second response to the user device or to another user device in response to the second tag report being received.

20 Claims, 7 Drawing Sheets

TRANSFORMABLE NEAR FIELD COMMUNICATION TAG

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Technological advances over the last decades have significantly increased the convenience to customers when purchasing groceries and other goods. For example, customers now have the possibility, in a large number or even in the majority of cases, of accessing websites hosted by suppliers of goods and services and of studying offers and product information online. Further, customers can, in some cases, even order food and beverages on the website of a supermarket and request a home delivery on a particular day.

More generally, the ordering and home delivery has the advantage of simplifying the supply of products to households, because a single vehicle of a delivery company may deliver large quantities of products and access a large number of households. This avoids having a large number of households participating in traffic as individuals, as many customers would otherwise drive back and forth between various stores (such as supermarkets) and shop individually. To summarize, one may conclude that this de-individualizing of the consumer traffic associated with transportation of consumer goods may be a way to promote environmental-friendliness of our societies.

For some customer groups (for example, for the elderly), having to find the right website to order or re-order desired products and of finding the right menus for doing so on a website, etc., may be a cumbersome task. In addition, repeatedly performing such tasks may annoy customers, and some customers thus tend to fall back into a routine of driving around and exploring stores instead of engaging in more progressive forms of purchasing behavior involving the use of more recent technology. There are thus concerns remaining with respect to environment-friendliness of a customer's good purchasing habits and also with respect to convenience for the customers.

With the aforementioned advantages, come also particular types of concerns such as security issues. When customers shop via the internet and enter credit card information, the possibility exists that sensitive data is stolen and potentially abused. This means that data security is an increasingly important aspect to always be taken into account in this context as well. As an illustrative example, reference is made to so-called dash devices, which are used to conveniently order (or reorder) products in a particularly easy way. A dash device is a WiFi compatible device that is typically equipped with just a single button that allows directly ordering products via the internet by pressing the button. While such a dash device may improve convenience, in particular, for some customer groups, it also raises security concerns.

There is, hence, a need for technological advances suited to address one or more of the above-mentioned shortcomings.

SUMMARY

In an embodiment, a system is disclosed. The system comprises a near field communication tag coupled to a consumer product. The near field communication tag is transformable from a first state to a second state based on a state of the consumer product being transitioned from a first state to a second state. The system also comprises a server program stored on a non-transitory storage medium that, when executed by a server apparatus, receives a first tag report from a user device in response to the NFC tag being tapped while being in the first state and sends a first response from the server apparatus to the user device or another user device, or prompts another server apparatus to send the first response to the user device or another user device, in response to the first tag report being received. The server program, when executed by the server apparatus also receives a second tag report from the user device or another user device in response to the NFC tag being tapped while being in the second state and sends a second response from the server apparatus to the user device or another user device, or prompts another server apparatus to send the second response to the user device or another user device, in response to the second tag report being received. The first tag report is different from the second tag report and the second response is different from the first response.

In another embodiment, a method is disclosed. The method comprises tapping a near field communication (NFC) tag coupled to a consumer product with a user device. The NFC tag is transformable from a first state to a second state without updating or writing to the NFC tag. The method also comprises receiving, by a server program stored on a non-transitory storage medium and executed by a server apparatus, a tag report comprising registration information from the user device in response to the NFC tag being tapped by the user device while in the first state and sending, by the server program, a first response from the server apparatus to the user device or another user device, or prompting another server apparatus to send the first response to the user device or another user device, in response to the tag report comprising the registration information being received. The method additionally comprises receiving, by the server program, an indication from the user device or another user device that the NFC tag is to be transformed to a dash cap in response to sending the first response. The NFC tag is transformed from the first state to the second state based on receipt of the indication. The method further comprises sending, by the server program, a second response from the server apparatus to the user device or another user device, or prompting another server to send the second response to the user device or another user device in response to receiving the indication, the second response differing from the first response.

In yet another embodiment, a system is disclosed. The system comprises a near field communication (NFC) tag coupled to a consumer product. The NFC tag is transformable from a first state to a second state without updating or writing to the NFC tag. The system also comprises a server program stored on a non-transitory storage medium that, when executed by a server apparatus, receives a first tag report from a user device in response to the NFC tag being tapped and sends a first response from the server apparatus to the user device or another user device, or prompts another server apparatus to send the first response to the user device or another user device, in response to the first tag report being received. The server program, when executed by the server apparatus, also receives a second tag report from the user device or another user device in response to the NFC tag being tapped after the NFC tag is transformed from the first state to the second state. The first tag report is different from the second tag report. The server program, when executed by the server apparatus, further sends a second response from the server apparatus to the user device or another user device, or prompts another server apparatus to send the second response to the user device or the another user device, in response to the second tag report being received. The second response is different from the first response.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
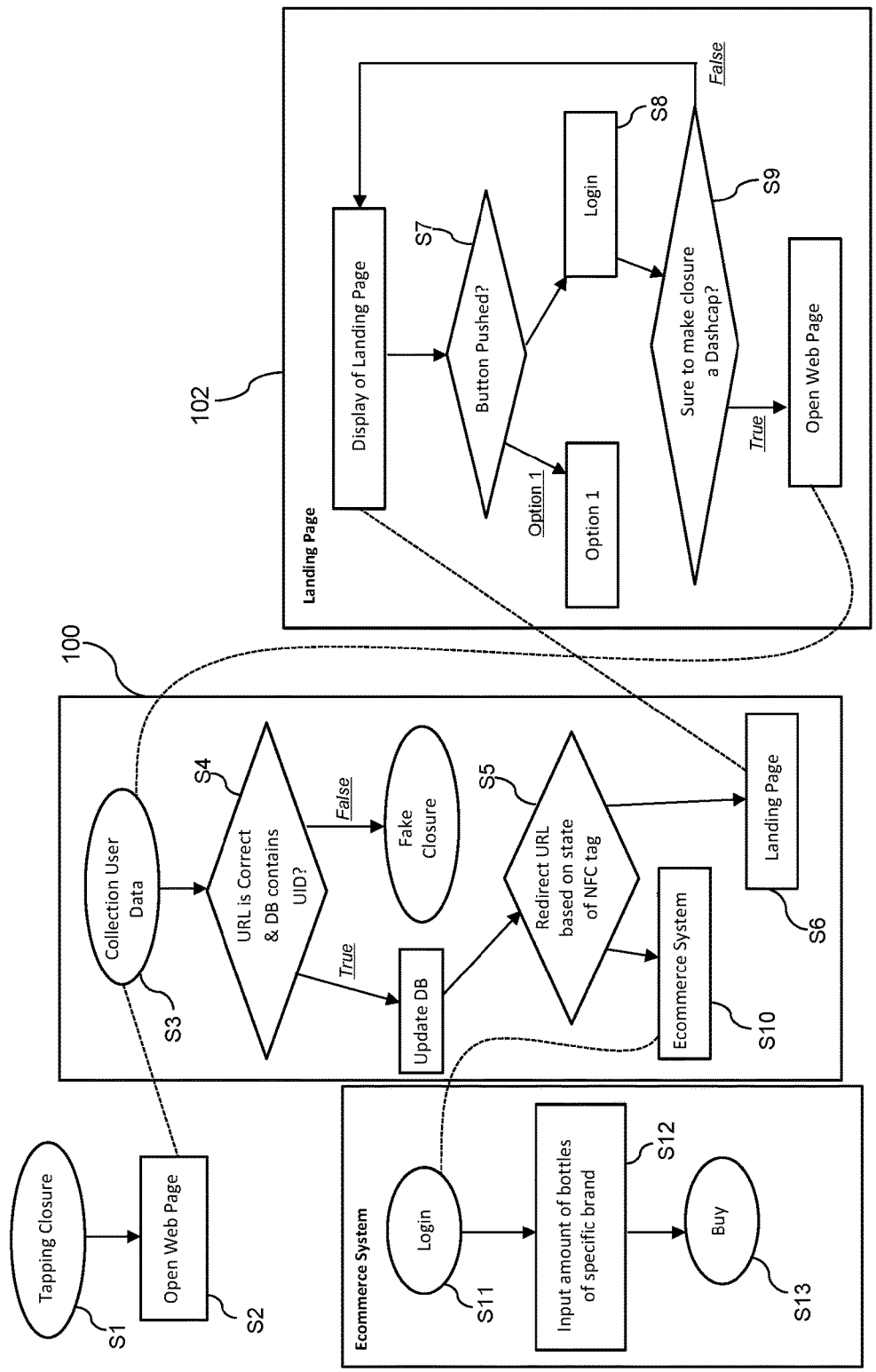
FIG. 1 is a schematic representation of steps carried out when using a system in accordance with the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Aspects of the above-mentioned object are achieved by a system comprising a near field communication (NFC) tag coupled to a consumer product. This NFC tag overcomes technical problems associated with traditional NFC tags that may change based on updating/writing to the NFC tag, which requires additional processing. In particular, the NFC tag discussed herein may transition to different states without updating/writing to the NFC tag. The NFC tag may transition to three or more states without updating/writing to the NFC tag. For example, a transition of the NFC from a first state to a second state may be effected by a user registering and a transition of the NFC tag from the second state to a third state may be the transformation of the NFC tag to a dash cap. The NFC tag may be updated or written to for other reasons during the life of the NFC tag and/or the life of the consumer product, but for the purposes of this application and achieving the state transitions of the NFC tag to enable particular, differentiated responses to one or more user devices, writing to or updating of the NFC tag is not needed.

In one example of the NFC being transitioned to different states without updating/writing to the NFC tag, the NFC tag discussed herein may transition to different states based on a state of the consumer product being transitioned from a first state to a second state such as by user action (e.g., twisting a cap, which interrupts a formerly closed loop) without requiring processing (e.g., such as by an independent NFC writer) for a state change, thereby resulting in a simpler, more efficient, more maintainable, and cost conscious IT solution. Different information may be provided to the user device depending on the state of the NFC tag.

In another example of the NFC tag being transitioned to different states without updating/writing to the NFC tag, the NFC tag discussed herein may transition to different states based on input to a user device. Registration information may be inputted into the user device and transmitted to a server. Based on receipt of the registration information, the server may determine that the NFC tag is in a first state and may send a particular response signal (e.g., that redirects the browser to a particular webpage) to the user device based on that determination. Through display of the particular webpage, the user may obtain product information and may also be able to select an option to turn the NFC tag into a dash cap. A dash cap as used herein may serve as a dash device when used together with the user device to enable direct ordering of products via the internet. Based on receipt of user input indicating that the user wants to turn the NFC tag into a dash cap, the NFC tag may be transitioned to a second state without a change to the programming of the NFC tag, and a server may send a particular response signal (e.g., that redirects the browser to an ecommerce system webpage) to the user device or another user device based on the transition to the second state. In an embodiment, the change in the NFC tag from the first state to the second state is performed by a platform such that when a user subsequently reads or taps the NFC tag with the user device or another user device, the browser of the user device or another user device is directed directly to an ecommerce product specific page to order the consumer product that the NFC tag is/was coupled to.

In some embodiments, the system presented herein may comprise the consumer product and a non-transitory storage medium. The consumer product and the storage medium may be physically separate and may be used in completely different locations.

The consumer product may, for example, be a container closure (for example, a bottle lid or cap or a jar lid or cap, etc.). The consumer product is provided with a near field communication tag and is transformable from a first state to a second state. A near field communication tag generally comprises a chip or processor and an antenna. To provide an example, such tag may, for example, be provided on the inside of a bottle lid. The transformability from the first state to the second state may, for example, be effectable by reversible or irreversible mechanical (or some other form of) action (for example, when a consumer opens a container closure and/or when the consumer separates the closure from the container, for example, by taking a lid off a bottle). The transformability may be one-way, i.e., only from the first to the second state. For other embodiments, it may be two-way, i.e., also from the second state to the first state. For example, the tag may comprise a loop connected to the chip that can be interrupted to thus change the state of the chip.

The storage medium may be provided with a server program stored thereon. The term "server program" is in this context in this application used to refer to a computer program that provides functionality for other programs or devices, sometimes referred to as clients (client-server model). In contrast, the term "server apparatus" is in this application used to denote a device in the sense of hardware that provides functionality for other programs or devices. Servers (as a generic term covering server apparatuses and server programs) may provide various functionalities such as sharing data or resources amongst several clients and/or performing computations for a client. A single server may serve multiple clients, and a single client may use multiple servers. A client process may run on the same device or may connect over a network to a server on a different device.

The near field communication tag and the server program, when run on a server apparatus, are configured to interact with a user device and, optionally, another user device, so that the server apparatus/program, and the tag are configured to perform the following method steps:

tapping the near field Communication tag with the user device;

sending a first tag report signal from the user device to the server apparatus if the consumer product was tapped while being in the first state, and sending a second tag report signal from the user device to the server apparatus if the consumer product was tapped while being in the second state, the first tag report signal differing from the second tag report signal;

receiving the first tag report signal and/or the second tag report signal by the server apparatus;

sending a first response signal from the server apparatus to the user device or to another user device, or prompting another server apparatus to send a first response signal to the user device or the another user device, when the first tag report signal is received; and sending a second response signal from the server apparatus to the user device or to another user device, or prompting another server apparatus to send a second response signal to the user device or the another user device when the second tag report signal is received, the second response signal differing from the first response signal.

A first or second tag report signal and a first or second response signal may be referred to a first or second report and a first or second response, respectively. Also, a signal may be referred to as a message. The labels "first" and "second" for the tag report signals and for the response signals, respectively, are merely labels for distinguishing between the respective signals but do not indicate an order or attribute any other feature(s) to the respective signals. Moreover, only the sending steps associated with the first signals or the sending steps associated with the second signals may be carried out (the expression "and" does not mean that both is required to be carried out sequentially, but only that the suitability to perform either of the steps is provided). Moreover, the sending of signals by the server apparatus "or" the prompting another server apparatus to send the signals may be considered alternatives, or both may be possible simultaneously.

The "tapping" of the tag may, for example, alternatively, be referred to as a "scanning" or "reading" the tag. The user device may be an NFC reader or writer, optionally it may be a mobile device (e.g., a smartphone or a tablet), or another handheld device configured to tap the tag.

Because different tag report signals are sent from the user device to the server apparatus, it is possible for the server apparatus to know whether the consumer product (e.g., the container closure/cap/lid) is in the first state or the second state. The consumer product may also be configured to be in more than two (for example, in three or more) states, and the discussed steps may be generalized to the case of three or more states. Depending on the state of the consumer product, different response signals may thus be sent back from the server apparatus or another server apparatus to the user device or another user device.

To provide examples, the server apparatus (for example, hosted by a first provider, for example, the producer of the consumer product) may redirect to another server (e.g., hosted by another provider, for example, the manufacturer of the container or the content thereof). Either of these may send back a response signal, selectively depending on the state of the tag, to the user device (e.g., the smartphone) or to another user device (e.g., a consumer's laptop or tablet that may be associated with the smartphone through some user ID connection etc.).

To provide a concrete example illustrating the more generally described aspects, the tag inside of a cap of a closed bottle may be tapped by a smartphone. The smartphone may then send a first tag report signal to a first server (a server that may, for example, be hosted by the manufacturer of the cap). The first server may then redirect to a second server (e.g., hosted by the manufacturer of bottle or content thereof such as liquor). The second server may then send a response signal to the smartphone, for example, a signal including an URL associated with the website belonging to the company hosting the second server. The website may then be displayed on the consumer's smartphone and offer, for example, product information.

When the consumer opens the bottle (e.g. after purchasing it), a mechanical action takes place. This action may break a part of the tag (for example, a formerly closed loop may be interrupted, as mentioned above), but this does not render the tag non-functional (as it, for example, still comprises a working chip or processor and antenna). The consumer may then again tap the tag (now residing in a second state). This may be considered also a form of tamper evidence mechanism, as the second tag report signal now contains (be it implicitly) the information that the bottle has been opened, whereas before opening the first tag report signal did not contain this information.

Now, a chain of communication depending from the second tag report signal may involve the second server sending a response signal to the smartphone (or a tablet, etc.) with an URL guiding directly to an order form for re-ordering bottles, or to a login form so that a user can login and then select to transform the tag into a device that may serve as a dash device when used together with the smartphone.

The possibility of this exemplified consumer product state-dependent communication between tag, user device, and server may increase consumer convenience. This way, it may also contribute to environment-friendliness because the consumer product's lifecycle may be extended. For example, non-discarding the consumer product after using it in the context of its first functionality (i.e., being a container closure) may be made more attractive to consumers. The consumer product may also enter a second stadium of its lifecycle by taking on a second functionality by serving to order products together with a smartphone. In addition thereto or alternatively thereto, the consumer product may also be provided with additional features, for example, a voucher code, etc. All of these aspects may increase the product status in the eyes of consumers thereby promoting a more environment-friendly handling of consumer products such as container closures, for example, bottle caps, lids, screw tops, etc.

Additionally, the tag of the consumer product is itself a passive device in the sense that it is not linked to a WiFi network. Thus, the security for consumers is also improved in case the tag is provided with a functionality associated with sensitive actions such as purchasing products (for example, involving the use of credit card or other sensitive data, etc.).

The tapping may involve sending an initiation signal from the user device to the tag and the sending of a reaction signal from the tag to the user device. Thus, it is not a requirement for the tag to have its own energy source (such as a battery).

As mentioned, the tag may comprise at least one loop, and the tag may be configured to send a first reaction signal to the user device when the at least one loop is intact. The loop is breakable by a consumer manipulating the consumer product. The breaking may be effected mechanically. For example, the at least one loop may be broken when a consumer removes the consumer product in the form of a container closure from the container (e.g., unscrewing a cap from a bottle). Said manipulation may take place within the consumer product itself or it may take place between the consumer product and an external object (like in the case of a bottle lid being removed/screwed/drawn off a bottle). The tag may be configured to send a second reaction signal to the user device when the loop is broken. The user device may be configured to send out the first tag report signal if it receives the first reaction signal and to send out the second tag report signal if it receives the second reaction signal.

According to some embodiments, the tag comprises at least one loop, and the user device is configured to send the first tag report signal to the server apparatus when the at least one loop is intact, wherein the loop is breakable by a consumer manipulating the consumer product, the breaking optionally to be effected mechanically, wherein the user device is configured to send the second tag report signal to the server apparatus when the loop is broken.

The consumer product may be a container closure for closing a container, and the tag may be configured such that the one loop is broken when a consumer removes the closure from the container.

The tag may be provided on the inside of the container closure. For example, the inside of the closure may further be provided with information such as a voucher code or a (tag) ID number or some other code which a user can enter to register on a website hosted by the server apparatus or another server apparatus, or to turn the tag into a dash device component (changing state).

The consumer product may be a closure of a container such as a bottle or jar. This may be particularly advantageous when combined with the ordering scheme using the dash-transformed tag, as consumers may be especially prone to drive around individually to pick up larger quantities of beverages due to heavy weight of a large number of bottles, etc. Another option is that the tag is used to activate a pickup service for empty bottles (for example, empty beer bottles are to be picked up, etc.). This may further promote environmental-friendliness.

The system may comprise the server apparatus including the non-transitory storage medium. Alternatively, the system may include the server apparatus with a different internal or externalized storage medium onto which the server program on the non-transitory storage medium of the system can be copied.

According to some embodiments, the server apparatus, when running the server program thereon, is configured to send a prompting signal to the another server apparatus in order to prompt the sending of the first or second or third, etc., response signal.

The first response signal may include a uniform resource locator and/or the second response signal may include a uniform resource locator. This way, the user device (or another user device) may be provided with selective URL information and, for example, a browser installed on the user device can be fed with the selective URL to display selective website content.

According to some embodiments, the consumer product may in the first state be configured to be used as a container closure for closing a container, and the consumer product may in the second state be configured to be attached to a surface of an external object.

The consumer product may be configured to be transitioned from the first to the second state by an input in the user device or another user device (e.g., by registering and/or logging in and/or using a tag ID or some other code that may be provided with or on the consumer product). For example, the tag may be turned from consumer product (e.g., bottle lid) into a form of dash device configured to interact with a smartphone, etc.

The user device may be a smartphone or another type of NFC reader or NFC writer, a tablet, a computer, a laptop, and/or the another user device may be a smartphone or another type of NFC reader or NFC writer, a tablet, a computer, a laptop, etc.

The second tag report signal may include order information for ordering or re-ordering a product, for example, it may be information for directly ordering one or products such as jars or bottles with a product provided therein (e.g., wine, beer, soft drinks, cocktails, liquor, etc.).

The system may be further configured to interact so as to perform the steps of: displaying a first website content on the user device or the another user device upon receiving the first response signal and displaying a second website content, differing from the first website content, on the user device or the another user device upon receiving the second response signal.

The server apparatus is according to some embodiments, when running the server program, configured to interact with the user device or the another user device so as to perform the following method steps: entering registration information, optionally an identification number of the tag, on the user device; sending the registration information to the server; and wherein the server apparatus is configured to send the second response signal or prompt another server to send the second response signal after receiving the registration information only; or the server is configured to send a third response signal or prompt another server to send a third response signal after receiving the registration information, the third response signal differing from the first response signal and from the second response signal. This concept may be extended to four or more states and signals, etc.

Another aspect of this disclosure relates to a method of communicating between a user device, a server apparatus with a server program stored thereon, and a consumer product provided with a near field communication tag, said consumer product being transformable from a first state to a second state, the method optionally comprising any one or several (any combination) of the previously described method steps that any of the aspects (or combinations thereof) of the system are configured to execute (or, more generally, for which the aspects of the system can participate in the execution).

Another aspect of this disclosure relates to a non-transitory storage medium assembly with a first program stored thereon and a second program stored thereon, the assembly comprising at least one non-transitory storage medium, wherein the first program and the second program may be stored on the same storage medium or on two different storage mediums, the first program being configured to be executed on a user device, optionally a smartphone, the second program being configured to be executed on a server apparatus, wherein the first and second programs are configured to cause the user device and the server apparatus to interact with a consumer product provided with a near field communication tag, so as to perform the method steps of in accordance with any one or several (any combination) of any of the previously described aspects.

Another aspect of this disclosure relates to a system comprising a consumer product and a non-transitory storage medium assembly, the non-transitory storage medium assembly being provided with a first program stored thereon and a second program stored thereon, the assembly comprising at least one non-transitory storage medium, wherein the first program and the second program may be stored on the same storage medium or on two different storage mediums, the first program being configured to be executed on a user device, optionally a smartphone, the second program being configured to be executed on a server apparatus, wherein the first and second programs are configured to cause the user device and the server apparatus to interact with a consumer product provided with a near field communication tag, so as to perform the following method steps: entering information in the user device to transform the user device from a first state to a second state; tapping the near field communication tag with the user device; sending a first tag report signal from the user device to the server apparatus if the user device is in the first state, and sending a second tag report signal from the user device to the server apparatus if the user device is in the second state, the first tag report signal differing from the second tag report signal; receiving the first tag report signal and/or the second tag report signal by the server apparatus; sending a first response signal to the user device or to another user device by the server apparatus, or prompting another server apparatus to send a first response signal to the user device or the another user device, when the first tag report signal is received; and sending a second response signal to the user device or to another user device by the server apparatus, or prompting another server apparatus to send a second response signal to the user device or the another user device when the second tag report signal is received, the second response signal differing from the first response signal.

Additional advantages and features of the present disclosure, that can be realized on their own or in combination with one or several features discussed above, insofar as the features do not contradict each other, will become apparent from the following description of particular embodiments.

Now turning to FIG. 1, the system itself (not shown) comprises a consumer product and a non-transitory storage medium. In this case, the consumer product is a closure (a bottle cap), and the content of the storage medium has been copied and stored on machinery (to be described in the following) that can be used to carry out data communication steps as follows.

In the case of this embodiment, the bottle lid in question is provided on a liquor bottle. Other embodiments of closures may be provided on different containers (e.g., fluid containers) such other bottles (e.g., wine or beer bottles) or jars, etc.

The closure is provided with a near filed communication tag on the inside, and it is possible to tap ("scan"/"read") the tag from the outside of the bottle, just by holding a suitable user device configured as a NFC tag reader against the closure. A consumer thus conveniently "taps" the closure (step S1) with the user device. The user device is internet compatible and, upon receiving the message, the user device sends a message to an IOT ("Internet of Things") platform and is then redirected to a landing webpage (URL) in a browser, for example, the browser of a smartphone.

In the case of the embodiment of FIG. 1, the user device is a smart phone. To carry out the tapping of the tag, the user device emits an initiation signal (providing the energy needed to trigger a response from the NFC tag). In response, the NFC tag on the closure sends a tag report signal to the smart phone. The tag report signal may be based on a simple NDEF exchange protocol (SNEP) and may contain information such as a uniform resource locator (URL).

On said smart phone, a web browser is stored, and the tapping of the closure results in the browser opening a webpage (S2) hosted by a first server. The website hosted by the first server is schematically represented as functional block 100 in FIG. 1. The term "first server 100" is, in this context, used to refer to a server program stored on a server (the latter referring to a "server" in the sense of hardware).

The first server 100 collects user data transferred by the smart phone (step S3) that is (partially or fully) based on the information read out from the tag. Then, a check is performed (step S4) whether the specified URL is correct (e.g., whether the URL specified by the tag corresponds to the website hosted by the first server 100) and whether a database contains a UID (a unique identifier/a unique identification code such as a number) corresponding to the tapped tag.

If the check in step S4 produces a negative result (wrong URL or invalid UID), i.e., "FALSE" in block diagram 100, a "fake closure" is identified and the procedure ends. This protects against faking of a product such as a bottle with a closure and/or a closure and may thus increase safety for consumers. If, on the contrary, the check (S4) yields a positive result (correct URL and valid UID), a database on the first server 100 is updated (for example, a counter may increase a counter number that counts how often the tag has been tapped). For example, when a bottle is standing in a store, the counter number may be increased by one, and the first server 100 knows how often the bottle (closure) has been tapped. Alternatively or in addition thereto, other updated to a database can be performed. For example, the location of the tag may be identified (i.e., it may be established that it is positioned in a particular store or other location via location information transferred from the user device).

If the check (S4) is successful, a response signal is generated (step S5) by the first server 100. The response signal is a redirection of URL and is sent back to the consumer's smart phone to redirect the browser to another webpage. Which URL the browser is redirected to by the response signal may depend on a state of the NFC tag on the bottle. For example, the browser may be directed to a "landing page" (step S6) hosted by a second server, schematically represented by block diagram 102.

The second server 102 sends a response signal to the smart phone. More generally, the smart phone and the second server 102 communicate to exchange data as will be detailed in the following. For example, in the case of this embodiment, the smart phone displays a landing page of the website corresponding to the second server 102, and the consumer is offered the possibility to turn the tapped NFC tag into a dash cap which can then be used to directly order further products very conveniently.

The consumer is presented with the option of pressing one or several buttons on the website of the second server 102 (step S7). Depending on what the consumer selects, the browser redirects to particular webpages (for example, detailed information about the product in the bottle, represented by "Option1" in block diagram 102). The consumer can also turn the tag into a dash cap. In this embodiment, the consumer is presented with a mask for entering registration information (step S8). Such a registration may typically take place when a user has bought the bottle, consumed the content, and now wishes to easily and conveniently reorder the product. The consumer can take the lid and turn it into a dash cap and then keep it in a convenient position, e.g., on the fridge in the kitchen. The closure of the bottle may, to this end, be provided with a magnet (or some other attachment means) allowing convenient placement and storing at a chosen location.

To avoid misunderstandings or unwanted transformation of state of the closure with the tag, this embodiment asks a consumer (with a message on the screen of the smart phone), whether she or he is sure about turning the tag into a dash cap (step S9). If the consumer answers "no", then the browser is redirected to the landing page of the second server 102. If the consumer answers affirmatively, however, then the state of the tag is transformed, and it then enters a second phase of its lifecycle as a consumer product. It may then serve as a product and/or brand individualized dash cap.

Turning back to step S5 of redirection of URL of the first server 100, if the tag has been transformed to a dash cap, the redirection may be effected to an ecommerce system webpage (hosted by the first server 100 in the case of this embodiment). This is represented as step S10 in FIG. 1.

On the ecommerce webpage of the first server 100, a consumer is presented with the option of logging in (by reentering the login data specified earlier on in the registration process of step S8). Alternatively, according to some embodiments, a consumer may wish to stay logged in permanently. The step of logging in is represented as step S11 in FIG. 1.

When logged in, the consumer can conveniently specify (step S12) the number of bottles of a specific brand to be ordered on a webpage opened in the smart phone's browser and then click to confirm the order (step S13) on the browser of the smartphone. The ordered bottles may then, e.g., be delivered to a selected address.

As just described, a consumer may in this way first use the closure including the NFC tag as a bottle lid until the bottle has been emptied or until there is no desire to continue using the closure. The consumer may then decide to use the closure for a different purpose, and in this way, the closure including the NFC tag may enter a second phase of its life cycle in which it exerts a functionality that differs from the earlier functionality of serving as a closure for a container. This may increase the product status in the eyes of consumers. This in turn may promote a more environment-friendly handling of container closures such as bottle caps, lids, screw tops, etc.

The NFC tag does not need to change status and/or programming, so that the NFC tag may always remain in the same state during the first part and the second part of its life cycle. A change may, however, be performed to an IOT platform such that when a user reads (taps) the NFC tag in a bottle lid/cap (or some other container closure) before or after opening the container, the consumer is then led to different websites. For example, the consumer may tap the bottle lid of a closed bottle in a supermarket and the smartphone may then, for example, automatically open up the brand manufacturer's website (after having received a signal from the server or from another server communicating with said server).

A different state may, however, be reached if the user opens the container (for example, the bottle). When the container is opened (for example, the cap containing the NFC tag is moved to open the bottle), a loop may be broken. If the loop is broken, this information is conveyed to the smartphone (not shown in FIG. 1). The information that the loop has been broken may be used to change the information presented to a user on the smartphone. The consumer may then be presented with a different website associated with a different URL.

Another way of ensuring that the container has been opened is that a confirmation code is provided on the inside of the closure, wherein the consumer may enter the confirmation code on the website. The consumer is then redirected to a different part of the website. For example, the closure with the NFC tag may then acquire a new function of an ordering tool. The consumer can tap it to send a signal with the smartphone to a server for ordering another container (e.g., another bottle). This way, the function of a dash device can be replaced by the closure and the smartphone.

In this regard, it is optionally ensured that transforming the container closure from a closure to a dash-type of ordering device by mistake is avoided. For example, after having opened a container, the user may, for example, when tapping the tag, be presented with the option on the website displayed on the tapping device (e.g., the smartphone) of making a dash cap. From this land page menu, as described above, the consumer can choose the option and be guided into a login or short procedure of registration on the ecommerce website. If not already registered, the consumer will be asked to fill in typical basic information to create an account, and will then be allowed repetitive ordering of products (delivery address, billing address, payment method). At the end of such a successful procedure, the IOT platform will change the re-directing address of the NFC, sending the consumer directly to the ecommerce product specific page. The consumer may then, for example, be presented with the option of simply tapping the cap to order (or re-order) products. Further, a password protection mechanism may be integrated. In some cases, a specific kind of tag (DNA tag) with a UID number of the tag may also work as a protection against frauds.

The use of a closure with a NFC tag instead of a dash device in accordance with prior art may offer the advantage of sparing a consumer from having to buy a separate device as the consumer can instead just use the closure together with a NFC reader (for example, a smartphone). The closure with the NFC tag also does not depend on a WiFi connection. It can just be used together with the smartphone, for example, wherever desired. It also very easy to use the closure provided with the NFC tag in different places. For example, the closure may be provided with some attachment means for attaching the closure to a surface of an external object. For example, the closure may be provided with a magnet and may be attached to a fridge or another piece of kitchen furniture. A closure including an NFC tag may be placed in an appropriate location of choice, for example, in the household, or it may be used as a key holder. As discussed, it may be provided with the functionality of contributing to the process of re-ordering a product in question (for example, the container with which the closure was used and/or other products manufactured by the same company).

Another option is that the "opened closure" is used as a purchasing proof and may, for example, be used once (or repeatedly) in the form of a voucher to get discounts (for example, when re-ordering products). This may be used to provide a further incentive for users to engage in environment-friendly and responsible product purchasing behavior.

Figure 2:
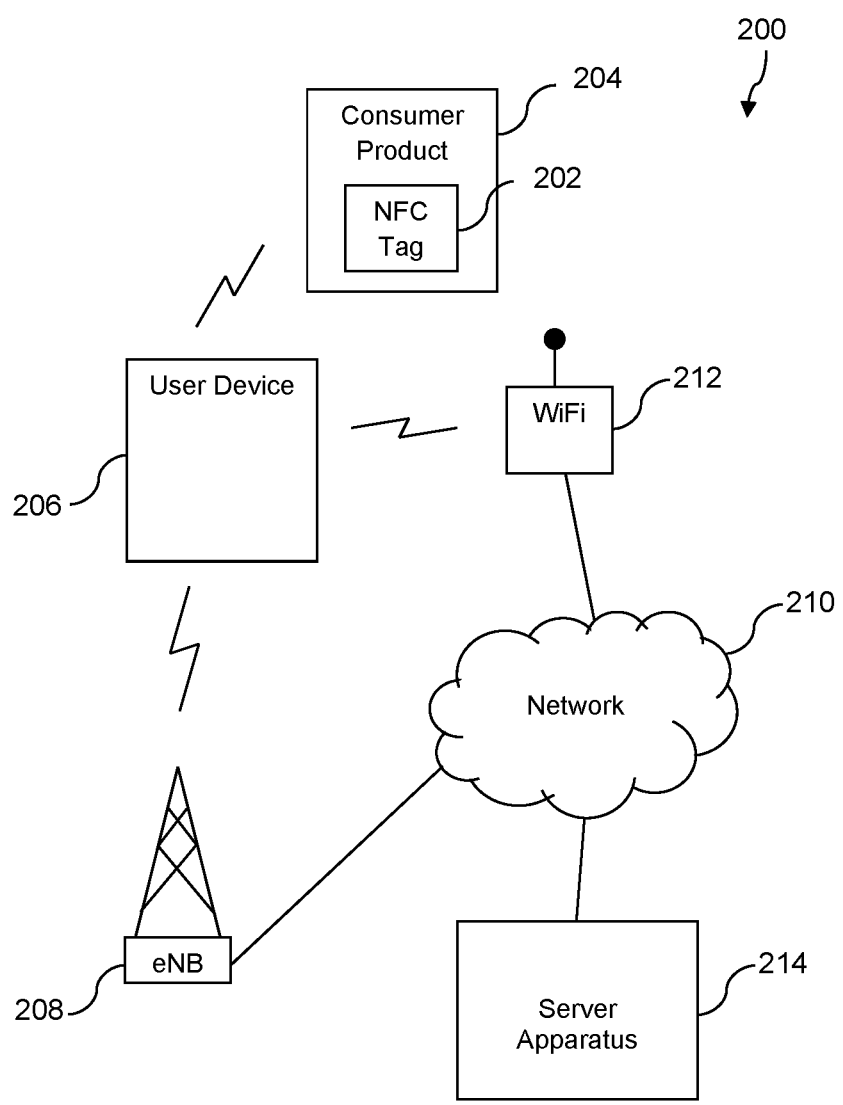
FIG. 2 is a block diagram of a system according to an embodiment of the disclosure.

Now turning to FIG. 2, a system 200 is described. In an embodiment, the system comprises a near field communication (NFC) tag 202. In an embodiment, the NFC tag 202 is an NFC tag as discussed above with respect to FIG. 1. While described as an NFC tag, in some embodiments, the NFC tag 202 may be some other type of radio frequency identification tag. The NFC tag 202 may be coupled to a consumer product 204. For example, the consumer product 204 may be a container and the NFC tag 202 may be coupled to a container closure. Coupled as used herein comprises directly or indirectly coupled. In an embodiment, the consumer product 204 is a consumer product as discussed above with respect to FIG. 1.

In an embodiment, the system 200 also comprises a user device 206. The user device 206 may comprise a mobile device such as a smart phone as discussed above with respect to FIG. 1. Mobile devices are discussed further hereinafter. The user device 206 may comprise a cellular radio transceiver (not shown) that may be able to establish a wireless communication link to a cell site 208 which communicatively links the user device 206 to a network 210. The user device 206 may further comprise a WiFi radio transceiver (not shown) that may establish a wireless communication link to a WiFi access point (AP) 212 which communicatively links the user device 206 to the network 210. The user device 206 may further comprise a processor, a display, and a non-transitory memory. The memory may store one or more applications such as a client program.

The user device 206 may be a mobile phone, a smart phone, a personal digital assistant (PDA), a media player, a wearable computer, a headset computer, a laptop computer, a notebook computer, or a tablet computer. The cell site 208 may be an enhanced Node B (eNB), a base transceiver station (BTS), a picocell, or other cellular radio access network (RAN) access point. The cell site 208 may provide a cellular wireless communication link to the user device 206 according to at least one of a long-term evolution (LTE), a code division multiple access (CDMA), a global system for mobile communications (GSM), or a worldwide interoperability for microwave access (WiMAX) cellular telecommunication protocol. The system 200 may comprise any number of user devices 206, any number of cell sites 208, and any number of WiFi APs 212.

The system 200 may also comprise a server apparatus 214, which may be implemented as a computer system. Computer systems are described further hereinafter. The server apparatus 214 may comprise the server apparatus discussed above with respect to FIG. 1. In an embodiment, the server apparatus 214 may comprise one or more applications such as a server program. In an embodiment, the server program, when executed by the server apparatus 214, receives a first tag report from the user device 206 in response to the NFC tag 202 being tapped and sends a first response from the server apparatus 214 to the user device 206 or another user device, or prompts another server apparatus to send a first response to the user device 206 or another user device, in response to the first tag report being received. The server program may also receive a second tag report from the user device 206 or another user device in response to the NFC tag 202 being tapped after the NFC tag 202 is transformed from a first state to a second state and sends a second response from the server apparatus 214 to the user device 206 or another user device, or prompts another server apparatus to send a second response to the user device 206 or another user device, in response to the second tag report being received. The first tag report may be different from the second tag report and the second response may be different from the first response.

In an embodiment, the NFC tag 202 may be transformed from the first state to the second state based on user input to a user device (e.g., user device 206). In another embodiment, the NFC tag 202 may be transformed from the first state to the second state based on a state of the consumer product being transitioned from a first state to a second state such as by user action (e.g., twisting a cap, which interrupts a formerly closed loop). In both embodiments, the NFC tag 202 may be transformed from the first state to the second state without writing to or updating the NFC tag 202.

The network 210 comprises one or more private networks, one or more public networks, or a combination thereof. The network 210 promotes communication as desired among the server apparatus 214 and the user device 206.

Figure 3:
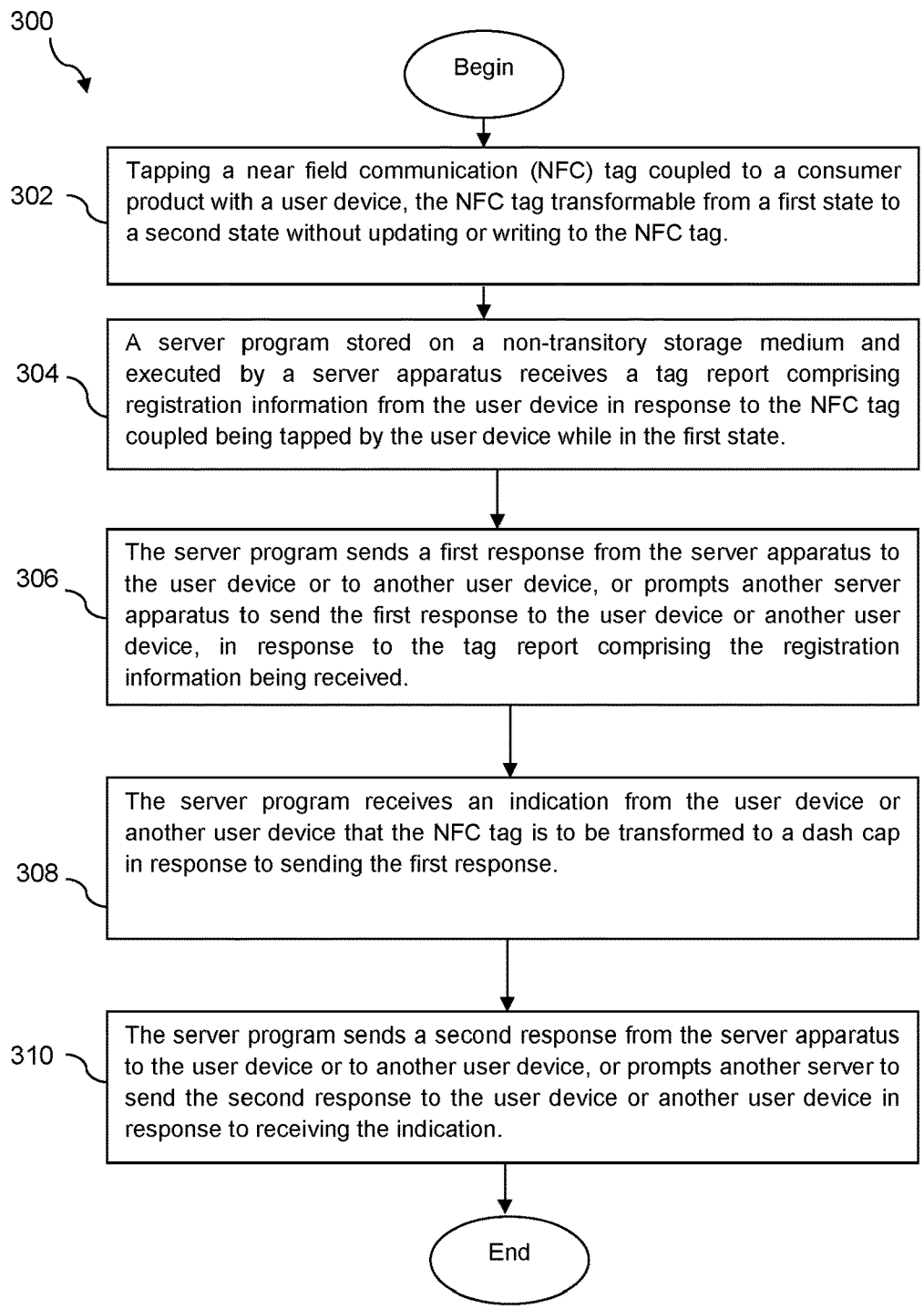
FIG. 3 is a flow chart of a method according to an embodiment of the disclosure.

Turning now to FIG. 3, a method 300 is described. At block 302, a user device taps a near field communication (NFC) tag coupled to a consumer product. The NFC tag is transformable from a first state to a second state without updating or writing to the NFC tag. At block 304, a server program stored on a non-transitory storage medium and executed by a server apparatus receives a tag report comprising registration information from the user device in response to the NFC tag coupled being tapped by the user device while in the first state. At block 306, the server program sends a first response from the server apparatus to the user device or to another user device, or prompts another server apparatus to send the first response to the user device or another user device, in response to the tag report comprising the registration information being received. At block 308, the server program receives an indication from the user device or another user device that the NFC tag is to be transformed to a dash cap in response to sending the first response. The NFC tag is transformed from the first state to the second state based on receipt of the indication. At block 310, the server program sends a second response from the server apparatus to the user device or to another user device, or prompts another server to send the second response to the user device or another user device in response to receiving the indication. The second response is different from the first response.

Figure 4:
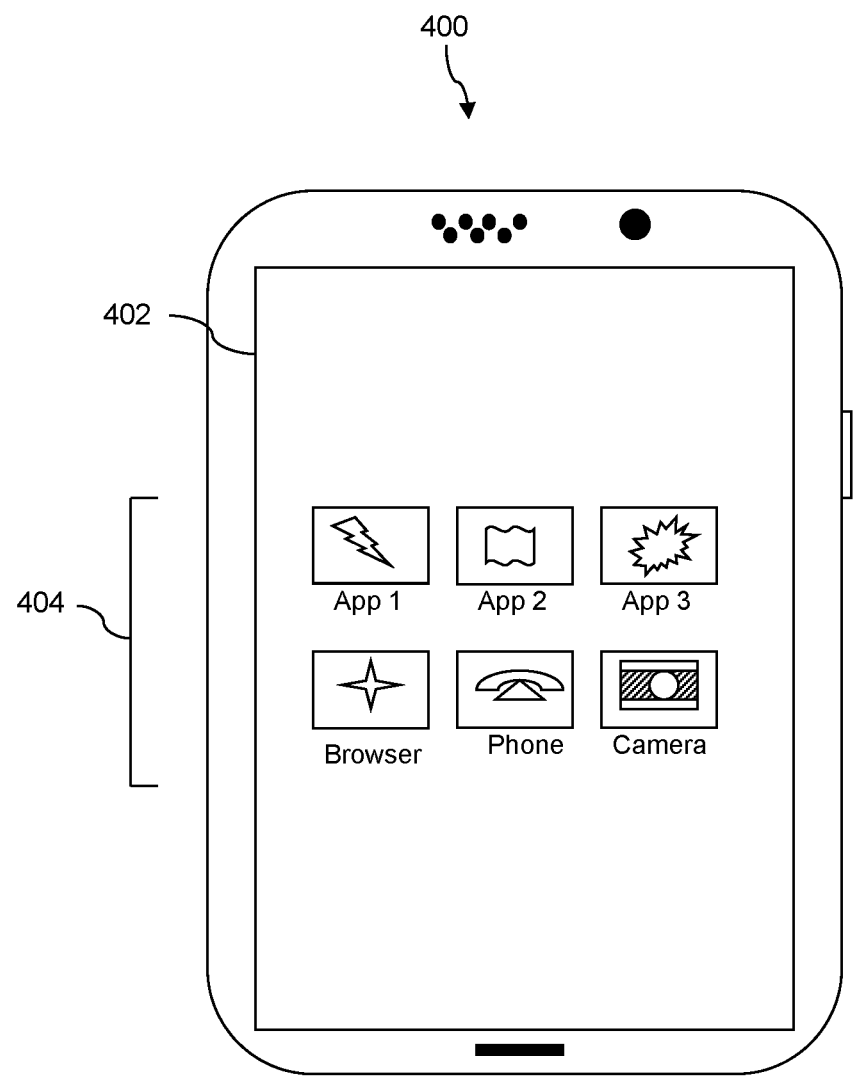
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
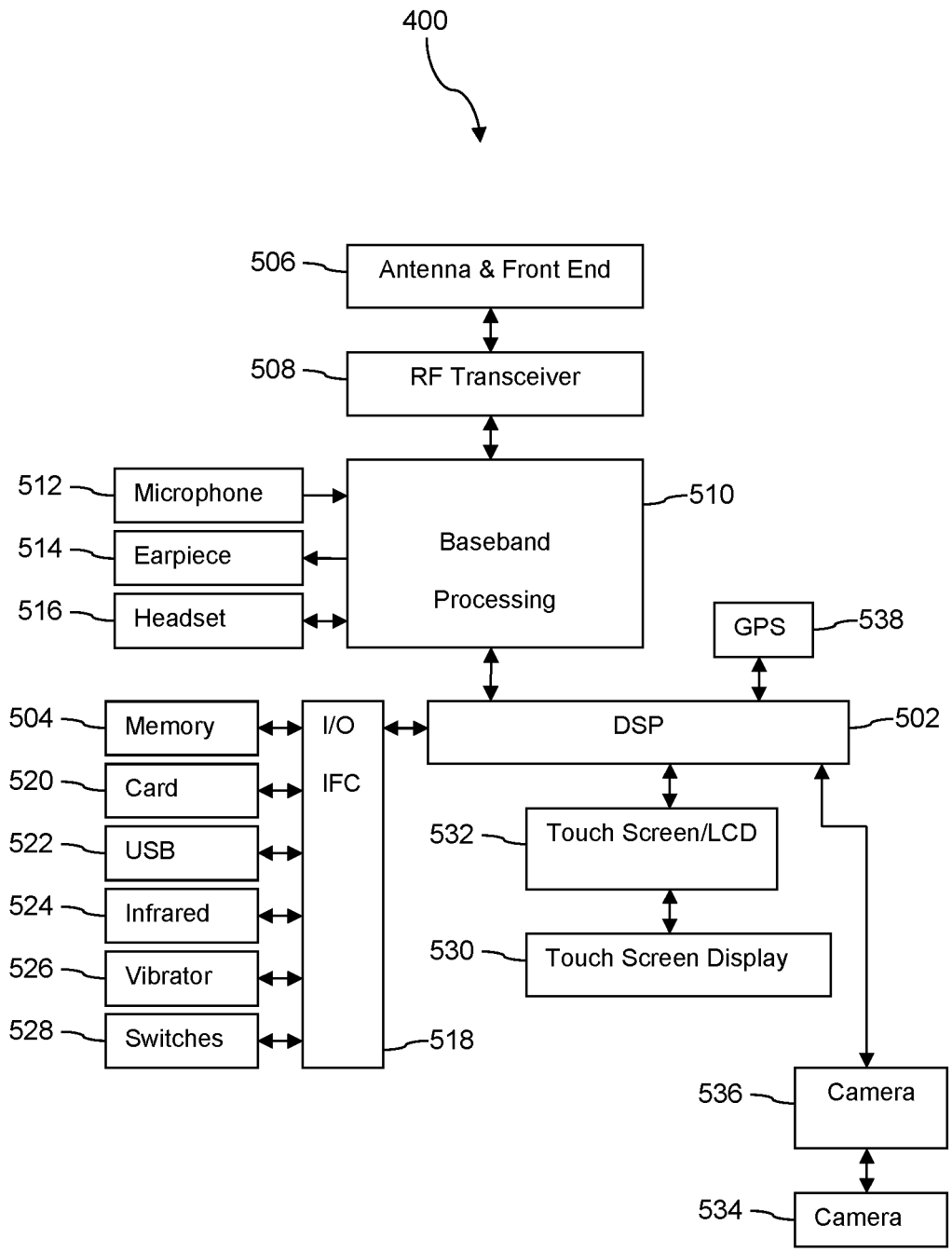
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
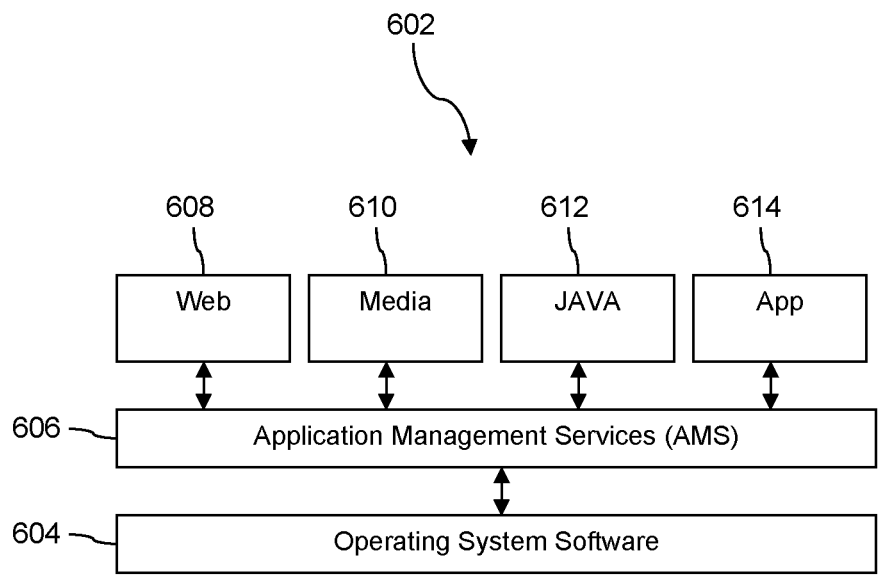
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
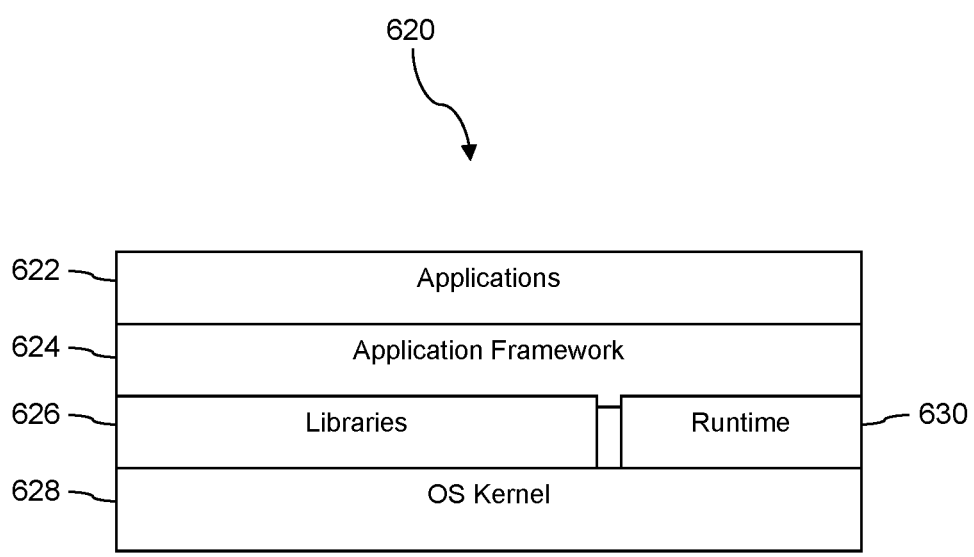
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
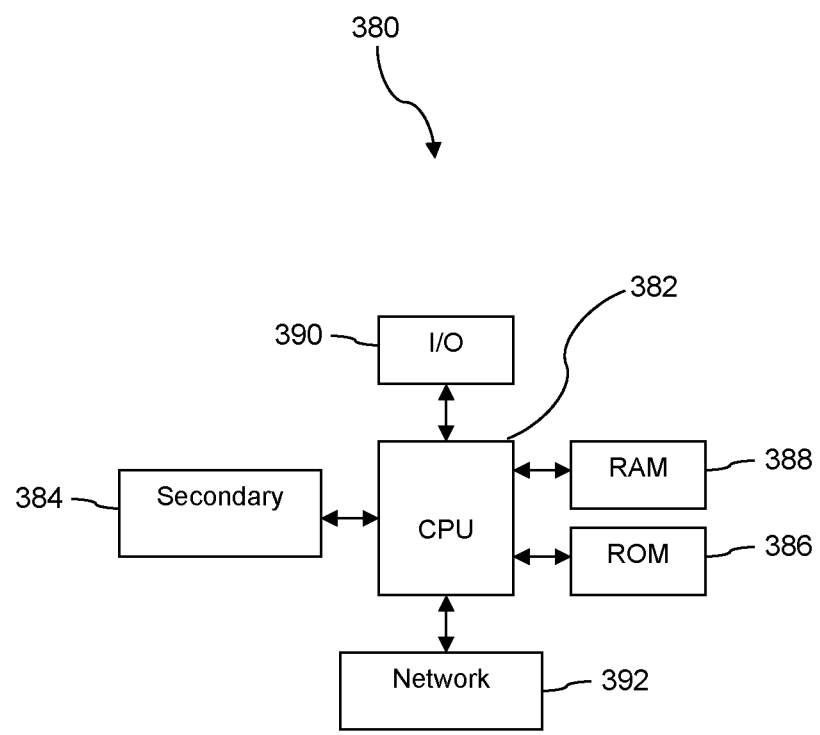
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
   a near field communication (NFC) tag coupled to a consumer product, the NFC tag being transformable from a first state to a second state based on a state of the consumer product being transitioned from a first state to a second state; and
   a server program stored on a non-transitory storage medium that, when executed by a server apparatus,
      receives a first tag report from a user device in response to the NFC tag being tapped while being in the first state,
      sends a first response from the server apparatus to the user device or another user device, or prompts another server apparatus to send the first response to the user device or another user device, in response to the first tag report being received,
      receives a second tag report from the user device or another user device in response to the NFC tag being tapped while being in the second state, the first tag report differing from the second tag report, and
      sends a second response from the server apparatus to the user device or another user device, or prompts another server apparatus to send the second response to the user device or another user device, in response to the second tag report being received, the second response differing from the first response.

2. The system of claim 1, further comprising the user device, wherein the user device taps the NFC tag, and wherein the tapping involves sending an initiation message from the user device to the NFC tag and sending a reaction message from the NFC tag to the user device.

3. The system of claim 2, wherein the NFC tag comprises at least one loop and the NFC tag is configured to send a first reaction message to the user device when the at least one loop is intact,
wherein the loop is breakable by a consumer manipulating the consumer product, and
wherein the NFC tag is configured to send a second reaction message to the user device when the loop is broken.

4. The system of claim 2, wherein the near field communication tag comprises at least one loop, and the user device is configured to send the first tag report to the server apparatus when the at least one loop is intact,
wherein the loop is breakable by a consumer manipulating the consumer product, and
wherein the user device is configured to send the second tag report to the server apparatus when the loop is broken.

5. The system of claim 3, wherein the consumer product is a container closure for closing a container, and the NFC tag is configured such that the loop is broken when a consumer removes the closure from the container.

6. The system of claim 5, wherein the NFC tag is provided on the inside of the container closure, and wherein the consumer product is a bottle lid.

7. The system of claim 1, wherein at least one of the first response or the second response includes a uniform resource locator.

8. The system of claim 1, wherein the consumer product is in the first state configured to be used as a container closure for closing a container, and the consumer product is in the second state configured to be attached to a surface of an external object.

9. The system of claim 1, wherein at least one of the user device or the another user device is a smartphone or another type of NFC reader.

10. The system of claim 1, wherein the second tag report includes order information for ordering or re-ordering a product.

11. The system of claim 1, wherein the user device or the another user device displays a first website content upon receiving the first response and the user device or the another user device displays a second website content, differing from the first website content, upon receiving the second response.

12. A method comprising:
tapping a near field communication (NFC) tag coupled to a consumer product with a user device, the NFC tag transformable from a first state to a second state without updating or writing to the NFC tag;
receiving, by a server program stored on a non-transitory storage medium and executed by a server apparatus, a tag report comprising registration information from the user device in response to the NFC tag being tapped by the user device while in the first state;
sending, by the server program, a first response from the server apparatus to the user device or another user device, or prompting another server apparatus to send the first response to the user device or another user device, in response to the tag report comprising the registration information being received;
receiving, by the server program, an indication from the user device or another user device that the NFC tag is to be transformed to a dash cap in response to sending the first response, wherein the NFC tag is transformed from the first state to the second state based on receipt of the indication; and
sending, by the server program, a second response from the server apparatus to the user device or another user device, or prompting another server to send the second response to the user device or another user device in response to receiving the indication, the second response differing from the first response.

13. The method of claim 12, wherein the first response and the second response include different uniform resource locators.

14. The method of claim 13, wherein the uniform resource locator included in the second response references a web page that enables ordering the consumer product.

15. The method of claim 14, further comprising:
tapping the NFC tag by the user device or another user device after the NFC tag is transformed from the first state to the second state;
receiving, by the server program, a second tag report from the user device or another user device in response to the NFC tag being tapped while in the second state; and
sending, by the server program, a third response from the server apparatus to the user device or another user device, or prompting another server to send the third response in response to receiving the second tag report, wherein the third response comprises the uniform resource locator included in the second response that references the web page to enable ordering the consumer product.

16. The method of claim 12, wherein the registration information comprises an identification number of the NFC tag.

17. The method of claim 16, further comprising: confirming, by the server program, that a uniform resource locator specified by the NFC tag is correct and the identification number of the NFC tag corresponds to one of a plurality of identification numbers stored in a database, wherein the first response is sent in response to the confirmation.

18. A system comprising:
a near field communication (NFC) tag coupled to a consumer product, the NFC tag being transformable from a first state to a second state without updating or writing to the NFC tag; and
a server program stored on a non-transitory storage medium that, when executed by a server apparatus,
receives a first tag report from a user device in response to the NFC tag being tapped,
sends a first response from the server apparatus to the user device or another user device, or prompts another server apparatus to send the first response to the user device or another user device, in response to the first tag report being received,
receives a second tag report from the user device or another user device in response to the NFC tag being tapped after the NFC tag is transformed from the first state to the second state, the first tag report differing from the second tag report, and
sends a second response from the server apparatus to the user device or another user device, or prompts another server apparatus to send the second response to the user device or another user device, in response to the second tag report being received, the second response differing from the first response.

19. The system of claim 18, wherein the NFC tag comprises at least one loop that is breakable and the NFC tag is transformable from the first state to the second state based on a state of the consumer product being transitioned from a first state to a second state by a consumer manipulating the consumer product, wherein the NFC tag sends a first reaction message to the user device when the at least one loop is intact and sends a second reaction message to the user device when the loop is broken, and wherein the user device sends the first tag report to the server apparatus when the at least one loop is intact and the user device sends the second tag report to the server apparatus when the loop is broken.

20. The system of claim 18, wherein the first tag report comprises registration information, wherein the first response is sent from the server apparatus or another server is prompted to send the first response only after receiving the registration information, and wherein the server program is further configured to:

receive an indication from the user device or another user device that the NFC tag is to be transformed to a dash cap in response to sending the first response, wherein the NFC tag is transformed from the first state to the second state based on receipt of the indication.

* * * * *